(12) United States Patent
Matuszczak et al.

(10) Patent No.: US 9,458,368 B2
(45) Date of Patent: Oct. 4, 2016

(54) COATED ICE MELTING COMPOSITIONS

(71) Applicant: MORTON SALT, INC., Chicago, IL (US)

(72) Inventors: Stephen Matuszczak, Chicago, IL (US); Syed Ali Shah, Oakbrook Terrace, IL (US); Kurt John Waatti, Crystal Lake, IL (US)

(73) Assignee: MORTON SALT, INC., Chicago, IL (US)

( * ) Notice: Subject to any disclaimer, the term of this patent is extended or adjusted under 35 U.S.C. 154(b) by 0 days.

(21) Appl. No.: 14/824,579

(22) Filed: Aug. 12, 2015

(65) Prior Publication Data

US 2015/0344759 A1    Dec. 3, 2015

Related U.S. Application Data

(62) Division of application No. 13/938,767, filed on Jul. 10, 2013, now Pat. No. 9,139,758.

(51) Int. Cl.
*C09K 3/18* (2006.01)

(52) U.S. Cl.
CPC .................................. *C09K 3/185* (2013.01)

(58) Field of Classification Search
CPC .................................. C09K 3/18; C09K 3/185
See application file for complete search history.

(56) References Cited

U.S. PATENT DOCUMENTS

| | | | | |
|---|---|---|---|---|
| 3,505,234 | A * | 4/1970 | Pinckernelle | C09K 3/18 252/385 |
| 3,833,504 | A * | 9/1974 | Neitzel | C09K 3/185 252/70 |
| 3,906,140 | A * | 9/1975 | Capes | B01J 2/28 252/70 |
| 4,849,171 | A * | 7/1989 | Murray | C23F 11/187 252/387 |
| 6,849,199 | B2 * | 2/2005 | Vickers, Jr. | C09K 3/185 106/13 |
| 7,294,285 | B2 * | 11/2007 | Koefod | C09K 3/185 106/13 |
| 7,658,861 | B2 * | 2/2010 | Koefod | C09K 3/18 106/13 |
| 9,139,758 | B2 * | 9/2015 | Matuszczak | C09K 3/185 |
| 2003/0061962 | A1 * | 4/2003 | Hoerle | B01F 7/00416 106/13 |
| 2009/0011125 | A1 * | 1/2009 | Hoerle | B01J 2/006 427/214 |

FOREIGN PATENT DOCUMENTS

| | | | |
|---|---|---|---|
| JP | 59-203471 A | * | 11/1984 |
| JP | 2002-155271 A | * | 5/2002 |

* cited by examiner

*Primary Examiner* — Anthony J Green
(74) *Attorney, Agent, or Firm* — Eric D. Babych; Brinks Gilson & Lione

(57) ABSTRACT

Ice melting compositions, methods for manufacturing ice melting compositions, and methods for melting ice are disclosed. The ice melting compositions can include a coarse deicing particle nucleus and a fine deicing particle coating substantially surrounding the coarse deicing particle nucleus. The fine particle coating can be attached or bonded to the coarse particle nucleus with a binder. The coarse particle nucleus and the fine particle coating can have a variety of particle sizes.

11 Claims, 3 Drawing Sheets

COATED ICE MELTING COMPOSITIONS

CROSS-REFERENCE TO RELATED APPLICATIONS

This patent application is a divisional application of U.S. Pat. No. 9,139,758, filed Jul. 10, 2013, the contents of which are incorporated herein by reference.

BACKGROUND OF THE INVENTION

The present disclosure generally relates to ice melting compositions. More particularly, the disclosure relates to ice melting compositions having improved coatings and ice melting capabilities.

Snow and ice can create hazardous conditions on sidewalks and roads. To deal with such hazardous conditions, it is known to spread salt on the snow or ice. As the salt particles come into contact with the snow or ice, melting begins and water is produced. This water and salt mixture is called "brine." Brine freezes at lower temperatures than regular water, so it remains a liquid at temperatures below freezing. The brine and salt particles work their way further into the snow and ice and eventually down to the road or sidewalk surface. From here, brine can spread out under the ice, breaking the bond between the road or sidewalk surface and the ice. The remaining snow and ice floats on top of the liquid brine, allowing traffic to easily break it down into slush. Finally, snow plows can move the slush to the side of the road or sidewalk.

BRIEF SUMMARY OF THE INVENTION

Surprisingly, the present inventors developed an ice melting composition that provides improved ice melting characteristics. In one aspect, the ice melting composition includes a coarse deicing particle nucleus, a fine deicing particle coating substantially surrounding the coarse deicing particle nucleus and being bonded to the coarse deicing particle nucleus with a binder. The binder is a sodium chloride brine with yellow prussiate of soda.

In another aspect, the ice melting composition includes a coarse deicing particle nucleus having a particle size range from about 500 μm to about 10,000 μm, a fine deicing particle coating substantially surrounding the coarse deicing particle nucleus and being bonded to the coarse deicing particle nucleus with a binder. The fine deicing particle coating consists of fine deicing sodium chloride particles having a particle size range from about 20 μm to about 600 μm.

The foregoing has outlined rather broadly the features and technical advantages of the present disclosure in order that the detailed description that follows may be better understood. Additional features and advantages will be described. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

The reference to particle size range in the present specification refers to an average particle size. Thus, reference to a particle size range of about 1,000 μm refers to particles having an average particle size of about 1,000 μm.

DETAILED DESCRIPTION OF THE INVENTION

Figure 1:
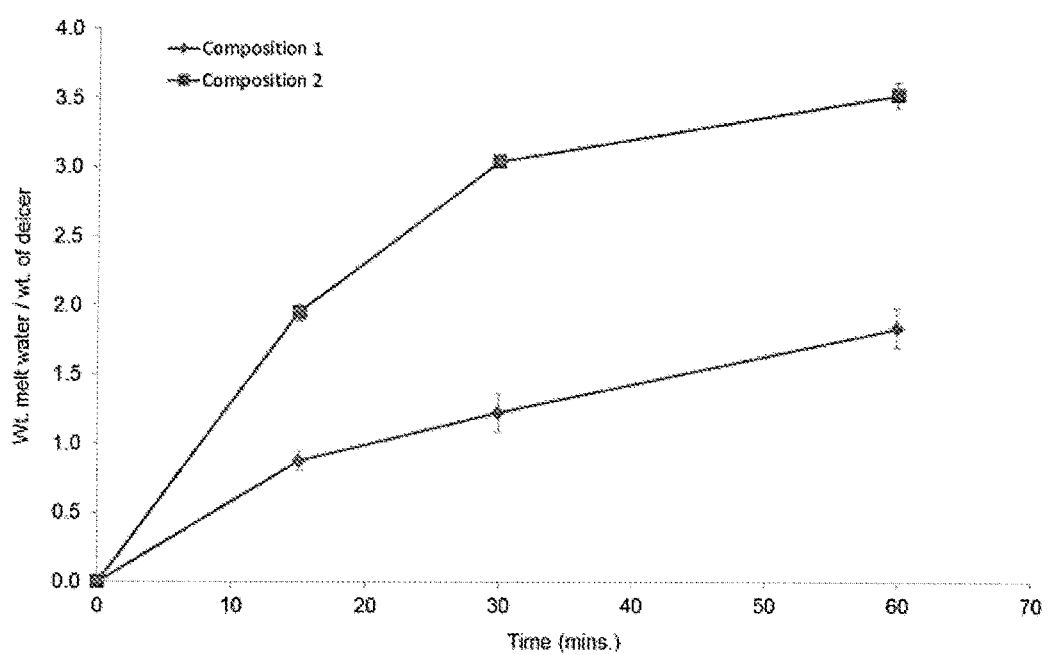
FIG. 1 shows the ice melting capabilities of ice melting compositions having different particle sizes.

In certain aspects, the ice melting compositions comprise a coarse deicing particle nucleus. The coarse deicing particle nucleus is coated with a fine deicing particle coating. The fine deicing particle coating substantially or fully surrounds the coarse deicing particle nucleus and is bonded or attached to the coarse deicing particle nucleus with a binder.

In accordance with certain aspects, the coarse deicing particle nucleus comprises a coarse sodium chloride particle. Other illustrative, non-limiting examples of coarse particles that can be used in accordance with the present disclosure are selected from calcium chloride, sodium acetate, magnesium chloride, potassium acetate, potassium formate, calcium magnesium acetate, calcium acetate, magnesium acetate, potassium chloride, sodium formate, urea, and any combination thereof. The nucleus can comprise one or more of the foregoing compounds and/or any combination of the foregoing compounds. In other aspects, the nucleus can comprise a coarse particle of sodium chloride with one or more of calcium chloride, sodium acetate, magnesium chloride, potassium acetate, potassium formate, calcium magnesium acetate, calcium acetate, magnesium acetate, potassium chloride, sodium formate, or urea. The nucleus can comprise one or more of the foregoing compounds and/or any combination of the foregoing compounds.

In certain aspects, the nucleus comprises a coarse particle compound, such as sodium chloride, having a particle size range from about 500 μm to about 10,000 μm. In other aspects, the nucleus comprises a coarse particle compound having a particle size range from about 1,000 μm to about 8,000 μm. In further aspects, the nucleus comprises a coarse particle compound having a particle size range from about 1,000 μm to about 5,000 μm. Additionally, the nucleus may comprise a coarse particle compound having a particle size range from about 1,000 μm to about 4,000 μm, from about 2,000 μm to about 4,000 μm, from about 500 μm to about 3,500 μm, from about 2,000 μm to about 6,000 μm, from about 4,000 μm to about 9,000 μm, from about 2,300 μm to about 3,400 μm, or any other sub-range of about 500 μm to about 10,000 μm. Thus, in one aspect, the ice melting composition can comprise a nucleus of coarse deicing particle sodium chloride having a particle size range from about 2,300 μm to about 3,400 μm.

As previously mentioned, the coarse deicing particle nucleus of the ice melting composition is coated with a fine deicing particle coating. In certain aspects, the fine particle coating comprises sodium chloride. In other aspects, the fine particle coating consists of sodium chloride. In the aspect where the fine particle coating consists of sodium chloride, no compounds or salts other than sodium chloride are included in the fine particle coating. For example, a salt, such as calcium chloride, would be excluded from the coating when the coating consists of sodium chloride. In other aspects, the fine particle coating may contain other compounds and/or salts known in the art of ice melting, such as calcium chloride or a combination of calcium chloride and sodium chloride. In still further aspects, the ice melting composition excludes calcium chloride. Additionally, in some aspects, the fine deicing particle coating excludes calcium chloride. While it has been suggested in the art that calcium chloride can provide beneficial effects in ice melting compositions, the present inventors have discovered that beneficial effects can be obtained with an ice melting composition that excludes calcium chloride or excludes calcium chloride from its fine deicing particle coating.

The fine particle coating comprises particles having a particle size range from about 20 μm to about 600 μm. In certain aspects, the fine particle coating comprises particles having a particle size range from about 50 μm to about 500 μm. In other aspects, the fine particle coating comprises particles having a particle size range from about 100 μm to about 400 μm, from about 100 μm to about 200 μm, from about 20 μm to about 150 μm, from about 200 μm to about 500 μm, from about 100 μm to about 125 μm, or any other sub-range of about 20 μm to about 600 μm. Thus, in one aspect, the ice melting composition can comprise a fine deicing particle sodium chloride coating having a sodium chloride particle size range from about 100 μm to about 125 μm. In another aspect, the ice melting composition can comprise a fine deicing particle coating, wherein the coating consists of sodium chloride particles, further wherein the sodium chloride particles have a particle size range from about 100 μm to about 125 μm.

It is advantageous if the particles forming the fine particle coating have a particle size range that is smaller than the particle size range of the coarse particle nucleus. In this regard, however, it is believed that some overlap (e.g. about 20% or less) is tolerable.

The binder used to bind or attach the fine particle coating to the coarse particle nucleus can include binders known in the art or it can comprise certain binders described below that have been found to yield beneficial technical effects. In certain aspects, the binder can be a liquid. The binder may comprise additional components, such as one or more dyes and/or one or more corrosion inhibitors. The dyes, for example, can impart color to the deicing particle and the corrosion inhibitors can reduce or inhibit the corrosion of a metal surface that might come into contact with the deicing particle.

The selection of the binder can be based on a number of factors. For example, in certain aspects, the binder may be selected based upon its contribution to the ice melting process. Also, if the binder is a brine, it could be saturated at room temperature. For example, a saturated magnesium chloride brine can be used in accordance with the present disclosure, as can a saturated sodium chloride brine with YPS. In accordance with the present disclosure, the term "YPS" refers to yellow prussiate of soda in the anhydrous form. Further, in certain aspects, the binder may not freeze at low temperatures, preferably as low as −5° F. If a brine of a common salt such as sodium chloride is employed, obtaining a saturated solution that does not freeze is difficult. For example, the use of a sodium chloride brine to wet a coarse particle nucleus can result in a reduction of ice melting efficiency, which can be attributed to freezing of the brine. In still further aspects, the presently disclosed binder could be chosen so that the presently disclosed fines (fine particle coating) adhere thereto but do not dissolve therein. Finally, the binder could be capable of wetting the entire outer surface, or substantially the entire outer surface, of the coarse deicing particle nucleus.

To overcome problems associated with certain prior art binders, the binder may be selected from the group consisting of magnesium chloride brine and sodium chloride brine with YPS. In other aspects, the binder can be saturated magnesium chloride brine or saturated sodium chloride brine with YPS. Other illustrative, non-limiting examples of binders that can be used in accordance with the present disclosure are solutions of inorganic salts, solutions of organic compounds, solutions of organic salts, organic liquids, inorganic salt solutions containing bio-derived organic materials such as sugars and carbohydrates, and organic solvents such as glycerol, propylene glycol, 1,3 propanediol, or any combination thereof. In a particular aspect, the binder is a sodium chloride brine with YPS.

A saturated magnesium chloride brine solution has a concentration of approximately 35% magnesium chloride at 20° C. As an illustrative, non-limiting example, a saturated magnesium chloride brine solution can be prepared by adding about 160 g of magnesium chloride hexahydrate to about 40 cm$^3$ of water. The mixture can be warmed while stirring until all of the magnesium chloride has dissolved. Subsequently, the mixture is allowed to cool and any solid precipitate can be removed by filtration. Of course, the amount of magnesium chloride needed to create the brine depends upon the volume of water being used and this disclosure is intended to cover any amounts of the components that would yield a saturated magnesium chloride brine solution having a concentration of approximately 35% magnesium chloride at 20° C.

As previously noted, in certain aspects, the binder is a saturated sodium chloride brine with YPS. As a saturated solution of sodium chloride (about 26.4 wt. %) is cooled below 32° F., sodium chloride dihydrate will begin to form and crystallize. The crystallization of sodium chloride dihydrate leads to freezing of the salt. However, if YPS is added to the saturated sodium chloride brine solution, the solubility of the salt is inhibited so that a saturated solution could be prepared at a lower sodium chloride concentration and thus have a lower freezing point (the temperature at which sodium chloride dihydrate crystallizes from solution). Also, as the amount of YPS added to the brine increases, the amount of sodium chloride dissolved to reach saturation decreases and the precipitation of sodium chloride dihydrate should be prevented.

In accordance with certain aspects of the present disclosure, a saturated sodium chloride brine with YPS can be formed by dissolving from about 0.2 g to about 1.4 g of YPS in about 200 mL water and adding an excess of sodium chloride (about 80 g). Of course, the amount of sodium chloride to be added depends upon the volume of the water being used. The binder can be formed from any volume of water and any amount of sodium chloride can be added to the water, so long as the amount is sufficient to form a saturated sodium chloride solution (about 24% by weight). The amount of YPS to be added is dependent upon the amount of sodium chloride added. In certain aspects, the saturated sodium chloride brine solution comprises about 700 ppm to about 5,000 ppm YPS. In additional aspects, the saturated sodium chloride brine solution comprises about 3,500 ppm to about 4,500 ppm YPS and in other aspects, the saturated sodium chloride brine solution comprises about 4,300 ppm to about 4,400 ppm YPS. If the total volume of the sodium chloride binder was about 200 mL, then 1.1 g of YPS would equal about 4,500 ppm. Once all components have been added to the water, the resulting solution can be stirred or shaken and any solid precipitate can be removed by filtration or settling.

The presently disclosed ice melting compositions can comprise various amounts of each of the coarse deicing particle nucleus, the fine deicing particle coating, and the binder. For example, in one aspect, the ice melting composition comprises from about 60% to about 97% of the coarse particle nucleus, from about 0.5% to about 6% of the binder, and from about 3% to about 35% of the fine particle coating. In another aspect, the ice melting composition comprises from about 84% to about 90% of the coarse particle nucleus, from about 2% to about 4% of the binder, and from about 8% to about 12% of the fine particle coating. As previously mentioned, in any of these aspects, the coarse particle nucleus can comprise sodium chloride, the binder can comprise a magnesium chloride brine or a sodium chloride brine with YPS, and the fine particle coating can comprise or consist of sodium chloride.

In one particular aspect, the ice melting composition comprises about 87% by weight of a coarse particle sodium chloride nucleus, about 10% by weight of a fine particle coating, and about 3% by weight of a saturated magnesium chloride brine binder. In this aspect, the fine particle coating can comprise sodium chloride or, it can consist of sodium chloride. The particle sizes of the sodium chloride nucleus can range from about 2,300 µm to about 3,400 µm and the particle sizes of the fine particle coating can range from about 100 µm to about 125 µm.

In another particular aspect, the ice melting composition comprises about 87% by weight of a coarse particle sodium chloride nucleus, about 10% by weight of a fine particle coating, and about 3% by weight of a saturated sodium chloride brine binder with YPS. The saturated sodium chloride brine binder includes from about 4,300 ppm to about 4,400 ppm YPS. In this aspect, the fine particle coating can comprise sodium chloride or, it can consist of sodium chloride. The particle sizes of the sodium chloride nucleus can range from about 2,300 µm to about 3,400 µm and the particle sizes of the fine particle coating can range from about 100 µm to about 125 µm.

The following describes a method of making the presently disclosed ice melting compositions. In general, an appropriate amount of the coarse deicing particle nucleus is added to a mixer. Subsequently, a binder is added to the mixer to wet the outer surface of the coarse deicing particle nucleus. Thereafter, fine deicing particles are added to the mixer, in a manner to substantially bind or adhere the fine deicing particles to the surface of the coarse particle nucleus. Alternatively, the fine particles forming the fine particle coating can be added to the mixer after addition of the coarse particle nucleus and subsequently, the binder can be added. After addition of the binder, the contents of the mixer are mixed to thoroughly wet the outer surface of each nucleus particle. Also, after the addition of the fine particle coating, the contents of the mixer can be mixed to be sure that the entire outer surface of each nucleus particle, or a substantial portion thereof, is thoroughly coated with the fine particles. The coating process may also be carried out in a continuous manner by the use of, for example, a pugmill. Optionally, after formation of the ice melting compositions, the compositions can be dried.

The components used in the presently disclosed methods are the same as the components described above in connection with the ice melting compositions. For example, in one aspect, the coarse deicing particle nucleus used in the methods can comprise sodium chloride and have a nucleus particle size within a range from about 500 µm to about 10,000 µm. In certain aspects, the binder used in the methods can comprise a magnesium chloride brine or a sodium chloride brine with YPS. The YPS can be present, for example, in an amount ranging from about 2,000 ppm to about 5,000 ppm. The fine deicing particle coating can comprise or consist of sodium chloride and comprise particles having particle sizes within a range from about 20 µm to about 600 µm. Again, the foregoing components, amounts, and sizes are merely illustrative and any component, amount, or particle size disclosed herein can be used in accordance with the disclosed methods.

The amounts of each component of the ice melting composition added during the disclosed methods can also be the same as described above. For example, the methods recited herein can produce ice melting compositions having from about 60% to about 97% of the coarse deicing particle nucleus, from about 0.5% to about 6% of the binder, and from about 3% to about 35% of the fine deicing particle coating. The methods recited herein can also produce ice melting compositions having about 87% by weight of the coarse deicing particle nucleus, about 10% by weight of the fine deicing particle coating, and about 3% by weight of the binder. Again, the foregoing components, amounts, and sizes are merely illustrative and any component, amount, or particle size disclosed herein can be used in accordance with the disclosed methods.

EXAMPLES

Example 1

Certain experiments were carried out to determine the ice melting capabilities of various sized particles. In one experiment, ice was melted with compositions having a broad particle size distribution and with compositions having a narrow particle size distribution. The broad particle size distribution lot, shown as Composition 1 in FIG. 1, comprised sodium chloride particles having a particle size generally within the range of less than 600 µm to about 4750 µm. The narrow particle size distribution lot, shown as Composition 2 in FIG. 1, comprised sodium chloride particles having a particle size less than 600 µm.

Ice plates were prepared by pouring deionized water into disposable, polystyrene plates. The plates were stored in a room at a temperature of +5° F. The resulting ice plates were aged for about 48 hours prior to use. After the 48 hour time period, a known amount of the ice melting composition was applied to the ice plates. Each ice plate was contacted with only one aspect of the ice melting compositions. After the desired amount of contact time had passed, the ice plate was tilted and any excess melt water was poured into an aluminum pan. The surface of the ice plate was wiped with a dry paper towel to collect any remaining melt water and undissolved ice melting composition. Additionally, the ice plate was removed from the tray and its underside was wiped with a dry paper towel to collect any water that may have collected there due to penetration of the ice by the ice melting composition.

The paper towels were placed in the aluminum pan and a second aluminum pan with holes punched in the side was placed on top and held in place. On completing the measurements, the pans were weighed, while ensuring that there was no condensed moisture on them. The pans were then dried for 16 hours at 80° C. and reweighed to give the amount of melt water collected. Samples of the ice melting compositions were also dried under the same conditions as the paper towels to determine the contribution, if any, of water in the ice melting compositions to the measured amount of melt water. The melt water measurement was corrected for the water present in the amount of ice melting composition used.

The first experiment was carried out at +5° F. FIG. 1 indicates that the ratio of the weight of melted water to the weight of the ice melting composition was higher for Composition 2 than Composition 1 at all time periods. These results indicate that smaller sized particles will melt ice faster than larger sized particles.

Example 2

In another experiment, particular aspects of the presently disclosed ice melting compositions were tested for ice melting capabilities. The same experimental steps described above were carried out where the ice melting compositions were added to ice plates at +5° F. For this experiment, five ice melting compositions were tested having the following characteristics:

Composition 1: Coarse particle sodium chloride (particle size from about 2300 μm to about 3400 μm);

Composition 2: Coarse particle sodium chloride nucleus (particle size from about 2300 μm to about 3400 μm) coated with about 3% by weight saturated NaCl brine containing about 4340 ppm YPS and about 10% by weight of fine particle sodium chloride (mean particle size of about 105 μm);

Composition 3: Coarse particle sodium chloride nucleus (particle size from about 2300 μm to about 3400 μm) coated with about 3% by weight saturated NaCl brine containing about 4340 ppm YPS;

Composition 4: Coarse particle sodium chloride nucleus (particle size from about 2300 μm to about 3400 μm) coated with calcium chloride brine (about 33% by weight) at about 10 gallons per ton (about 5.3% by weight); and Composition 5: Coarse particle sodium chloride nucleus (particle size from about 2300 μm to about 3400 μm) coated with magnesium chloride brine (about 30% solution) at about 10 gallons per ton (about 5.1% by weight).

Figure 2:
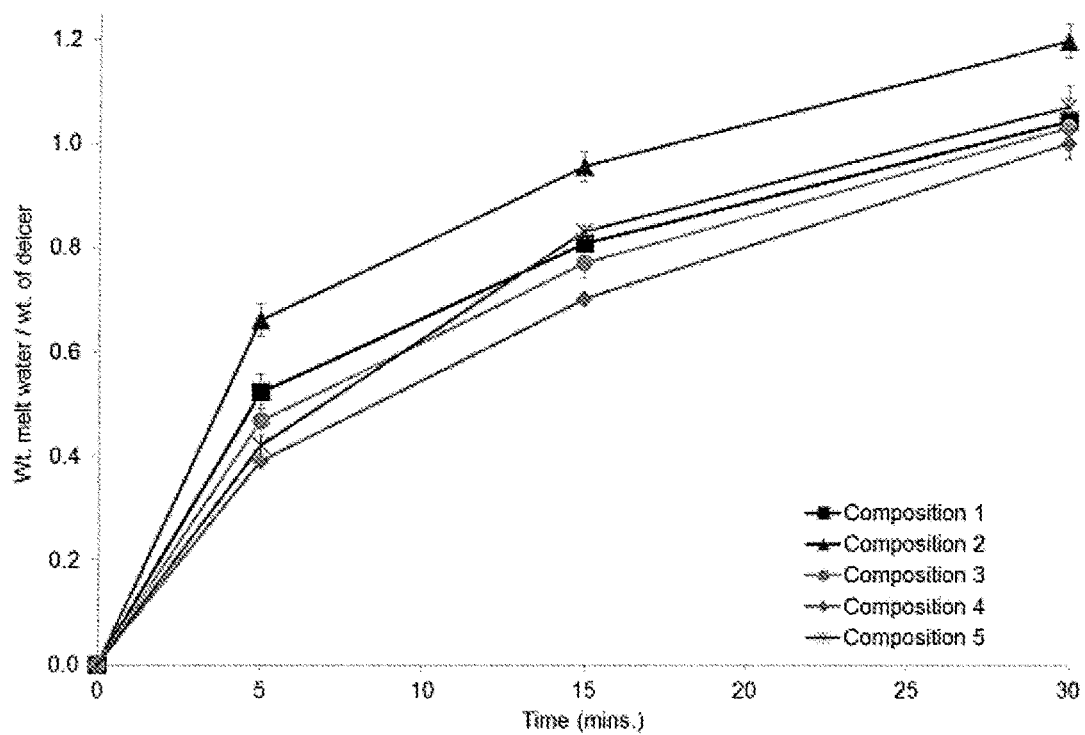
FIG. 2 shows the ice melting capabilities of certain aspects of the presently disclosed ice melting compositions.

As can be seen in FIG. 2, Composition 2, which was coated with the fine particle sodium chloride, outperformed all other ice melting compositions at all time periods analyzed.

Example 3

Another experiment was carried out to test the ice melting capabilities of certain aspects of the presently disclosed ice melting compositions. In this experiment, the procedures set forth in the previous experiments were used and ice melting capabilities were measured over a 30 minute time period at +5° F. The compositions used in this experiment were as follows:

Composition 1: Coarse particle sodium chloride (particle size from about 2300 μm to about 3400 μm);

Composition 2: Coarse particle sodium chloride nucleus (particle size from about 2300 μm to about 3400 μm) coated with saturated magnesium chloride brine at about 3% by weight and about 10% by weight of fine particle sodium chloride (mean particle size about 105 μm); and Composition 3: Coarse particle sodium chloride nucleus (particle size from about 2300 μm to about 3400 μm) coated with about 3% by weight saturated magnesium chloride brine.

Figure 3:
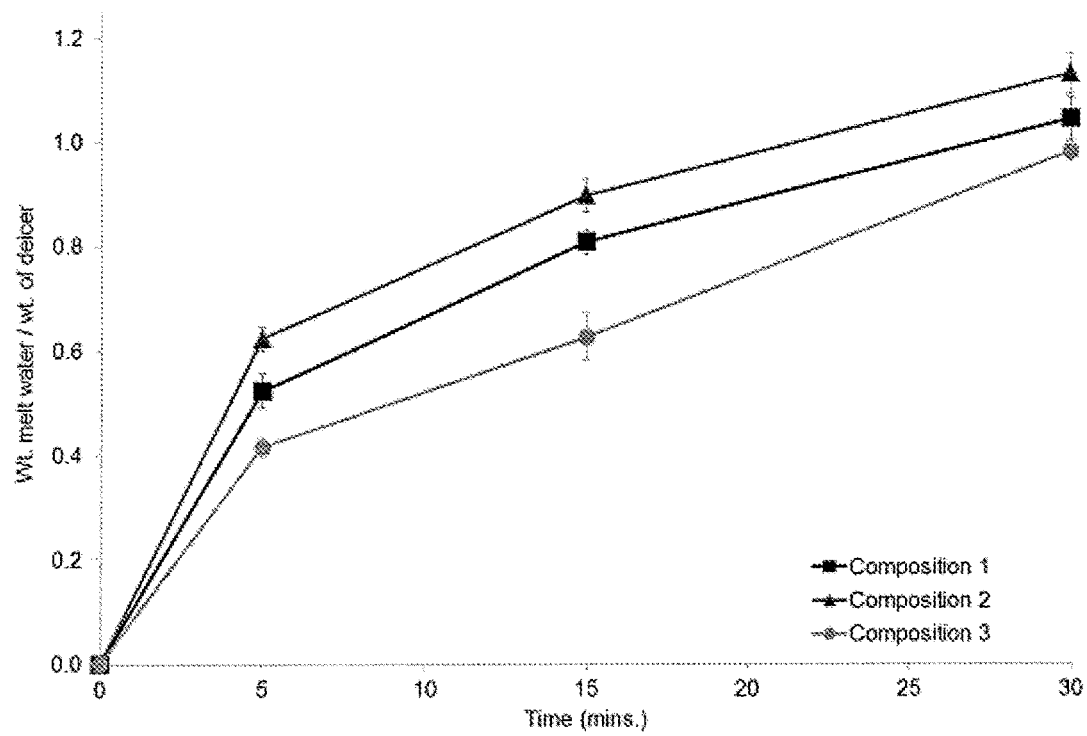
FIG. 3 shows the ice melting capabilities of other aspects of the presently disclosed ice melting compositions.

The data obtained from this experiment, which is depicted in FIG. 3, indicates that the composition coated with the fine particle sodium chloride outperformed the other compositions at all time periods analyzed.

All of the compositions and methods disclosed and claimed in this application can be made and executed without undue experimentation in light of the present disclosure. While this invention may be embodied in many different forms, the foregoing provides specific embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a composition" is intended to include "at least one composition" or "one or more compositions."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. An ice melting composition comprising:
   a coarse deicing particle nucleus comprising sodium chloride and having a particle size range from about 500 μm to about 10,000 μm,
   a fine deicing particle coating substantially surrounding the coarse deicing particle nucleus, wherein the fine deicing particle coating consists of sodium chloride deicing particles having a particle size range from about 20 μm to about 600 μm and being bonded to the coarse deicing particle nucleus with a binder.

2. The ice melting composition of claim 1, wherein the fine deicing particles have a particle size range from about 100 μm to about 300 μm.

3. The ice melting composition of claim 1, wherein the ice melting composition comprises from about 60% to about 97% of the coarse deicing particle nucleus, from about 0.5% to about 6% of the binder, and from about 3% to about 35% of the fine deicing particle coating.

4. The ice melting composition of claim 1, wherein the binder is selected from the group consisting of a magnesium chloride brine, a sodium chloride brine with yellow prussiate of soda, a solution containing inorganic salts, a solution of organic compounds, a solution of organic salts, an organic liquid, an inorganic salt solution containing bio-derived organic materials, an organic solvent, and any combination thereof.

5. The ice melting composition of claim 4, wherein the magnesium chloride brine is saturated and the sodium chloride brine is saturated.

6. The ice melting composition of claim 4, wherein the organic solvent is selected from the group consisting of glycerol, propylene glycol, and 1,3 propanediol.

7. The ice melting composition of claim 4, wherein the sodium chloride brine with yellow prussiate of soda binder comprises about 2,000 ppm to about 5,000 ppm of the yellow prussiate of soda.

8. The ice melting composition of claim 1, wherein the composition comprises from about 84% to about 90% of the coarse deicing particle nucleus, from about 2% to about 4% of the binder, and from about 8% to about 12% of the fine deicing particle coating.

9. The ice melting composition of claim 1, wherein the binder comprises a member selected from the group consisting of one or more dyes, one or more corrosion inhibitors, and any combination thereof.

10. An ice melting composition comprising:
a coarse deicing particle nucleus comprising sodium chloride and having a particle size range from about 500 μm to about 10,000 μm,
a fine deicing particle coating substantially surrounding the coarse deicing particle nucleus, wherein the fine deicing particle coating comprises sodium chloride deicing particles having a particle size range from about 20 μm to about 600 μm and being bonded to the coarse deicing particle nucleus with a binder.

11. An ice melting composition comprising:
a coarse deicing particle nucleus having a particle size range from about 500 μm to about 10,000 μm,
a fine deicing particle coating substantially surrounding the coarse deicing particle nucleus, wherein the fine deicing particle coating consists of sodium chloride deicing particles having a particle size range from about 20 μm to about 600 μm and being bonded to the coarse deicing particle nucleus with a binder,
wherein the ice melting composition comprises from about 60% to about 97% of the coarse deicing particle nucleus, from about 0.5% to about 6% of the binder, and from about 3% to about 35% of the fine deicing particle coating.

\* \* \* \* \*